(12) United States Patent
Kropp

(10) Patent No.: US 6,227,722 B1
(45) Date of Patent: May 8, 2001

(54) COMPONENT MODULE

(75) Inventor: Jörg-Reinhardt Kropp, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/299,360

(22) Filed: Apr. 26, 1999

(30) Foreign Application Priority Data

Apr. 24, 1998 (DE) .............................. 198 19 164

(51) Int. Cl.[7] ....................................... G02B 6/38
(52) U.S. Cl. ..................... 385/88; 385/89; 385/92; 385/52; 385/14
(58) Field of Search ................... 385/52, 51, 78, 385/80, 83, 88, 89, 91, 92, 94

(56) References Cited

U.S. PATENT DOCUMENTS 5,345,530 * 9/1994 Lebby et al. .......................... 385/88
5,371,820 * 12/1994 Welbourn et al. ..................... 385/76
5,420,954 * 5/1995 Swirhun et al. ...................... 385/92
5,715,338 * 2/1998 Sjolinder et al. ..................... 385/14
5,790,733 * 8/1998 Smith et al. .......................... 385/88

FOREIGN PATENT DOCUMENTS 36 08 018 A1   9/1987 (DE) .

* cited by examiner

Primary Examiner—Hemang Sanghavi
(74) Attorney, Agent, or Firm—Herbert L. Lerner; Laurence A. Greenberg; Werner H. Stemer

(57) ABSTRACT

A component module includes a substrate having a top side on which both a plurality of optical waveguides and first positioning structures are created by planar structuring. Joined to the substrate is a plug connector part, which has at least one mechanical alignment element for mechanical alignment relative to a complementary plug connection partner. The plug connector part has a joining side facing toward the top side which is provided with second positioning structures that cooperate with the first positioning structures.

6 Claims, 2 Drawing Sheets

COMPONENT MODULE

BACKGROUND OF THE INVENTION

Field of the Invention

The present invention relates to a component module.

Such a component module is used in the field of multichannel optical (data) communications, in which electrooptical component modules (so-called electrooptical modules) with a plurality of closely spaced optical channels are employed. The goal is to achieve the largest possible scale of integration, that is a small module size. Typically, the modules are intended for optical coupling, for instance to a data line with an optical pc bay or plug rack, in which a plurality of optical waveguide ends and thus a plurality of separate optical channels are carried in a plug connector part. Stringent demands are made in the production and assembly of such component modules.

A component module is known from European Patent Application EP 0 699 931 A1 to include a first substrate with optical waveguides having end surfaces that are beveled. Radiation emitted by the optically active zones of a converter mounted on a second substrate is coupled into the optical waveguides by total reflection from the end surfaces. Corresponding metallizations are provided on the substrates and on the converter in order to align the converter and the substrate with one another. During assembly, the surface tension of solder melted onto the metallizations is exploited for the sake of adjustment.

A coupling configuration is known from U.S. Pat. No. 5,420,954 in which surface-emitting laser diodes are disposed on the rear side of a first substrate. A plurality of optical waveguides end on an end surface of a second substrate and are aligned with the laser diodes through the use of parallel alignment pins and corresponding recesses on the first substrate.

In a further component module known from European Patent Application EP 0 682 279 A1, an optoelectronic element (for instance in the form of a photodiode) is disposed in such a way as to face toward the first surface of a semiconductor substrate. A V-shaped indentation and a V-shaped groove perpendicular thereto are provided on a second surface that is coplanar with the first surface for receiving an end of an optical waveguide. Light exiting the optical waveguide penetrates into intervening substrate material and is deflected by the side of the substrate material toward the indentation, on through the substrate and onto the photodiode. That coupling configuration is also comparatively complicated and involves optical losses.

German Published, Non-Prosecuted Patent Application DE 197 09 842 A1 discloses a coupling component module which includes a first plastic molded body as a substrate for a plurality of optical waveguides. Beveled end surfaces of the optical waveguides cause a beam deflection onto the optically active zones of a multichannel elecrooptical converter, which is fixed on a second substrate. The two substrates have cooperating alignment measures, in the form of oblique longitudinal surfaces that extend parallel to the optical waveguides and intersect the plane of the optical waveguides. The surfaces create a form lock, and as a result the end surfaces of the ends of the optical waveguides are laterally adjusted relative to the optically active zones. A form-locking connection is one which connects two elements together due to the shape of the elements themselves, as opposed to a force-locking connection, which locks the elements together by force external to the elements.

SUMMARY OF THE INVENTION

It is accordingly an object of the invention to provide a compact, large-scale integrated component module, which overcomes the hereinafore-mentioned disadvantages of the heretofore-known devices of this general type and which can be produced simply and without active adjustment provisions by known, well-mastered manufacturing techniques.

With the foregoing and other objects in view there is provided, in accordance with the invention, a component module, comprising a substrate having a top side and having elecrooptical converters with active zones; a plurality of optical waveguides disposed on the top side of the substrate, the optical waveguides having first ends each optically coupled to a respective associated one of the active zones of the elecrooptical converters; first positioning structures generated by planar structuring and disposed on the top side of the substrate; and a plug connector part connected to the substrate, the plug connector part having at least one mechanical alignment element for mechanical alignment relative to a complementary plug connection partner, and the plug connector part having a joining side facing toward the top side of the substrate, the joining side having second positioning structures cooperating with the first positioning structures.

Within the scope of the invention, an optical waveguide is understood to mean a device for transmitting an optical signal so that it is guided in a spatially defined way, especially so-called striplines or waveguides,, which may possibly require a jacket or outer coating ("cladding") with a lower index of refraction, for that purpose. An elecrooptical converter is understood to mean both a transmitting and a receiving element (such as light emitting diodes, surface-emitting laser diodes, or photodiodes). The optically active zone of the converter in a transmitter is understood as a light emitting surface, while in a receiver it is understood as a light-sensitive surface.

One substantial advantage of the present invention is considered to be that the coupling device belonging to the component module is made essentially in two parts. In other words, it includes at least part of the substrate, which is joined to the plug connector part through the joining side. This advantageously makes it possible to combine the advantages of different production techniques oriented to a specific material and a specific application in a single component (coupling component module) and thus to utilize them synergistically. The substrate and the optical waveguides can be configured in a desired way by planar structuring, and the requisite steps to achieve this are mastered in semiconductor technology and integrated optics with high precision and comparatively low costs. Recourse can be had to many suitable substrate materials with a view to the available production process therefor. Regardless of this, the plug connector part may be formed of a different material, which is optimized in terms of the plug connection properties, and can be made, for instance, by suitable, high-precision plastic molding techniques known from the field of precision injection molding, for instance for optical waveguide plugs. Suitable injection molding methods are described, for instance, in an article entitled "Design and Performance Advance in MT Connectors", by D. Braga and C. Whitelaw, in LIGHTWAVE, November 1997, pp. 61 ff.

Another substantial advantage of the component module of the invention is that because of the positioning structures provided with maximum precision on the corresponding parts (the substrate and the plug connector part), adjustment-free assembly of these parts is possible. The positioning structures can be made so precisely by the molding processes that after assembly, the alignment element is positioned exactly relative to the optical waveguides.

In accordance with another feature of the invention, the first positioning structures are formed from optical waveguide material. This feature is an advantageous refinement with regard to the precision of the positioning structures of the substrate.

As already explained above, present well-mastered surface structuring processes allow the use of many different substrate materials. For example, conventional printed circuit board material can be used. However, in accordance with a further feature of the invention, the plug connector part is a plastic molded part, and the substrate is formed of quartz glass.

In accordance with a concomitant feature of the invention, both indentations for receiving the optical waveguides and indentations that function as first positioning structures are made in the top side.

Other features which are considered-as characteristic for the invention are set forth in the appended claims.

Although the invention is illustrated and described herein as embodied in a component module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
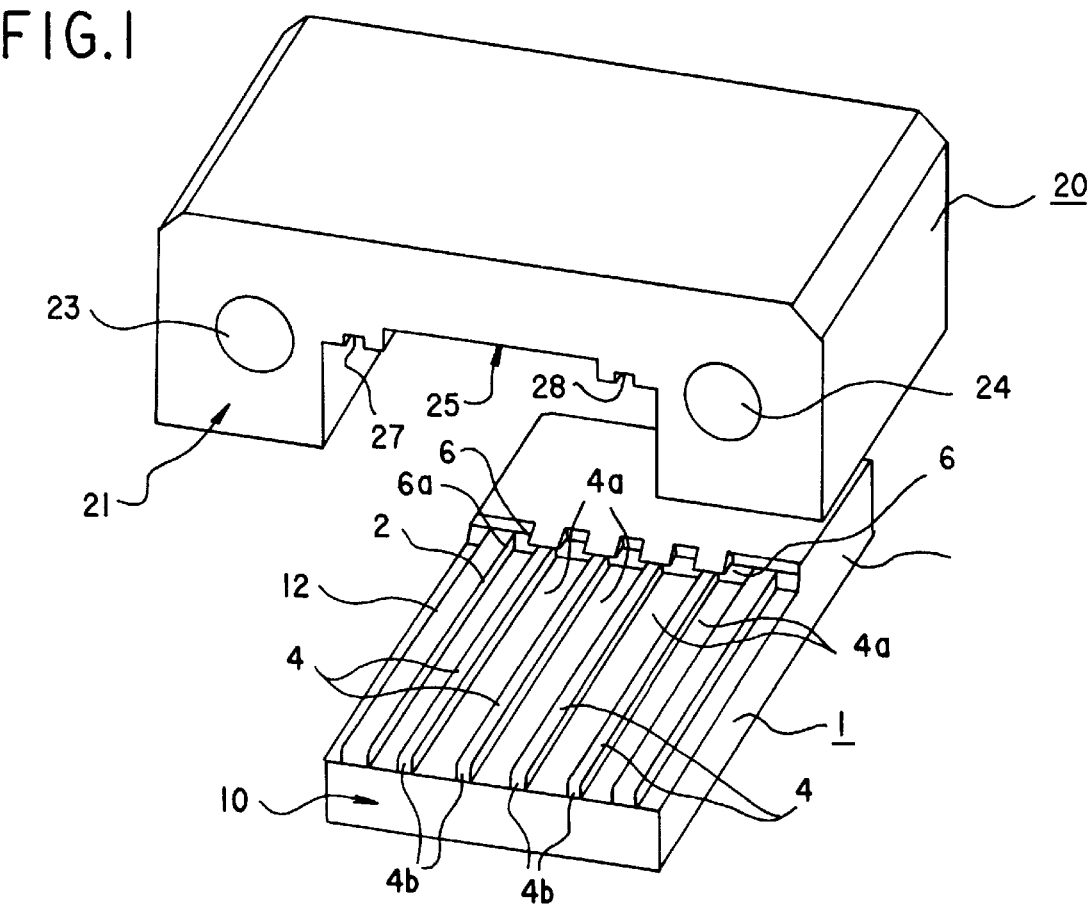
FIG. 1 is a diagrammatic, exploded, perspective view showing parts of a first component module of the invention before further assembly.

Referring now to the figures of the drawings in detail and first, particularly, to FIG. 1 thereof, there is seen a substrate 1 having a top side 2 on which a plurality of optical waveguides 4 (only four optical waveguides are shown in the exemplary embodiment) are provided by planar structuring. More precisely, the figure shows light-guiding cores, which have been structured, for instance by etching out of a light-guiding material, and can optionally also be surrounded in a known manner by a jacket or "cladding". First ends 4a of each of the optical waveguides 4 are optically coupled with respective associated active zones 6a of elecrooptical converters 6. In the exemplary embodiment shown in FIG. 1, a respective optical coupling path extends between one end 4a of an optical waveguide 4 and a zone 6a over a mirror surface 8 that is inclined by 45°.

A non-illustrated coupling partner is meant to be capable of being mechanically coupled to a front end surface 10 of the substrate 1, so that optical signals exiting from a second end 4b of the optical waveguides can be transmitted onward or further processed, or so that optical signals can be coupled into the optical waveguides 4 in the opposite direction.

Longitudinally extending adjustment or guide bars 12, 13 that act as first positioning structures are formed simultaneously with the optical waveguides 4 on the top side 2, on both sides of the optical waveguide array.

The guide bars 12, 13 can also be created instead by planar structuring before or after the formation of the optical waveguides 4 and can be made of a different material. From a production standpoint, however, a simultaneous formation of the bars 12, 13 and the optical waveguides 4 in a joint planar structuring process appears especially preferable. In that case, the bars 12 are formed of the same material as the optical waveguides (or optical waveguide cores).

FIG. 1 shows a separate plug connector part 20, which has bores or indentations 23, 24 acting as alignment elements.

The alignment elements 23, 24 begin at one end surface 21 and serve to provide mechanical alignment. The alignment elements 23, 24 are adapted in their dimensioning to corresponding alignment elements, for example in the form of alignment pins of a complementary plug connection partner, which is not illustrated in FIG. 1. High-precision adaptation of the diameters of the corresponding alignment elements assures that the plug connection partner comes to be aligned in a predetermined position relative to the plug connector part. In order to assure a precise alignment of the plug connection partner, or optical coupling partners (such as further optical waveguides and/or elecrooptical converters) disposed in the plug connection partner, with the front ends 4b of the optical waveguides 4, a very important factor is the relative position it of the alignment elements 23, 24 or of the plug connector part with respect to the substrate 1.

In order to assure this alignment automatically during assembly with the least possible effort for adjustment, a joining side 25 of the plug connector part 20 which is oriented toward the top side 2 has second positioning structures 27, 28. The second positioning structures are longitudinal grooves, which are open toward the joining side and are provided with high precision, for instance by plastic copy molding. The second positioning structures 27, 28 correspond with the first positioning structures 12, 13 of the substrate 1.

Figure 2:
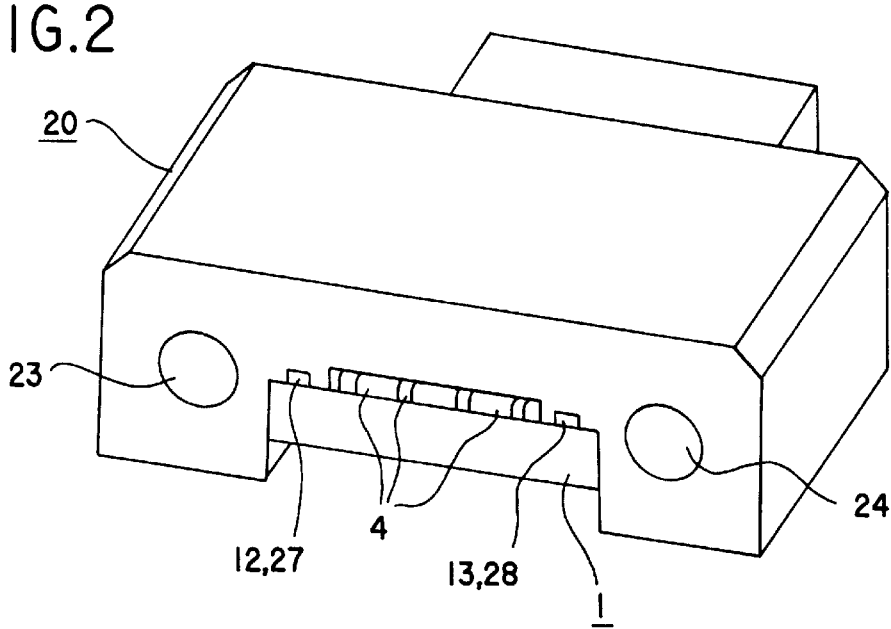
FIG. 2 is a perspective view of the component module of FIG. 1 in a more advanced stage of the assembly.

As FIG. 2 shows in this respect, the second positioning structures 27, 28 are adapted in their width and depth exactly to the first positioning structures 12, 13. The mechanical alignment elements 23, 24 thus attain a position relative to the ends 4b of the optical waveguides 4 that is exactly determined beforehand, so that the alignment elements bring about a high-precision alignment of the corresponding optical coupling partners of a complementary non-illustrated plug connection partner.

Figure 3:
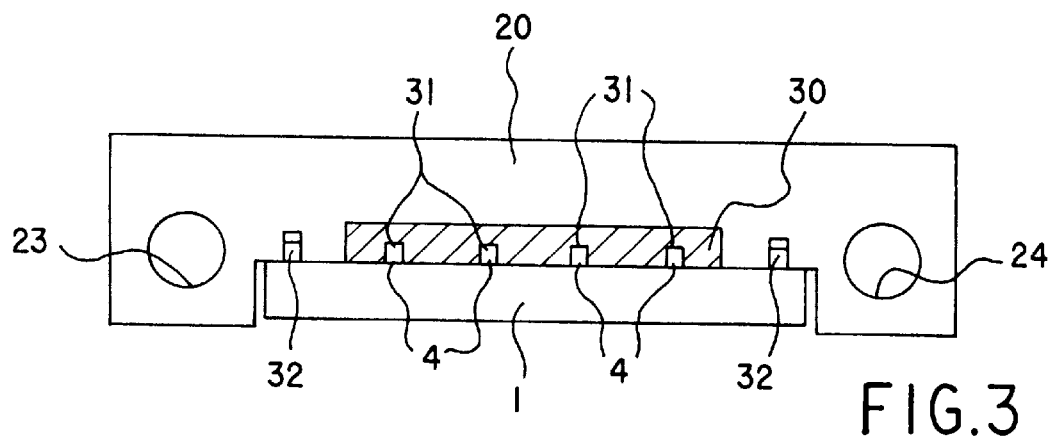
FIGS. 3–5 are front-elevational views of variants of component modules of the invention.

FIG. 3 shows possible ways of constructing the optical waveguides and jacket material surrounding them. The optical waveguides 4 in this case are surrounded by a polymer material 30, which is introduced between the plug connector part 20 and the substrate 1 and thus forms a jacket 31 for the optical waveguides 4. Geometries that are definitive for the actual fit between the first and second positioning structures are formed by material 32 of the planar-structured layer, which also forms the core material of the optical waveguides.

Figure 4:
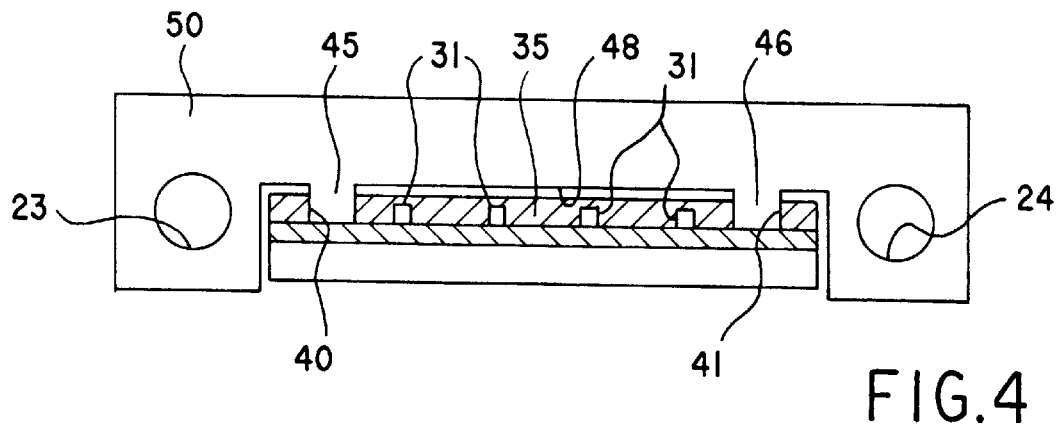

In a variant of the component module shown in FIG. 4, once again a polymer material 35 is provided, surrounding the optical waveguides 4 and thus acting as their jackets 31.

However, in this exemplary embodiment, planar-structured fitting contours of first positioning structures 40, 41 are formed by the material 35. The fitting contours of the first positioning structures 40, 41 interact with surfaces or sides of longitudinal ribs 45, 46 which are provided on a joining side 48 of a plug connector part 50.

Figure 5:
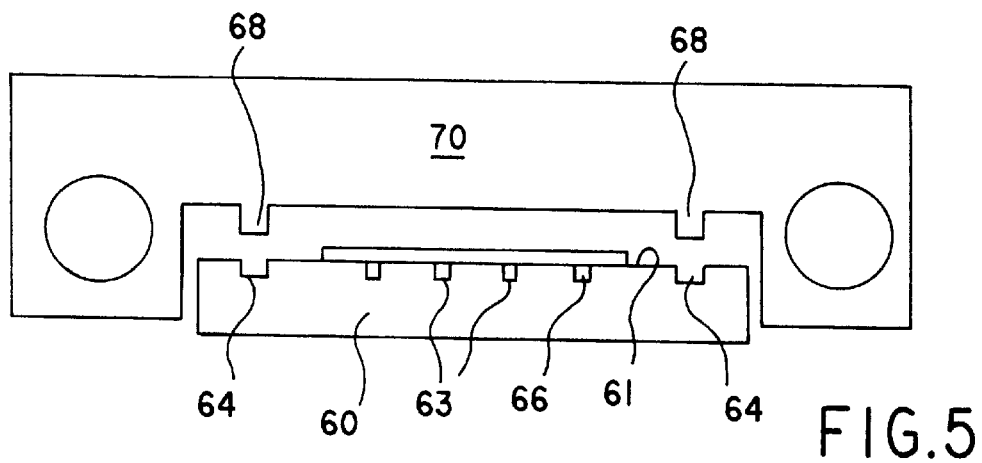

In a variant shown in FIG. 5, a substrate 60 is provided on its top side 61 with a plurality of grooves 63, 64 through the use of planar structuring. The grooves 63, which are of a first type, hold material 66 that functions as light-guiding cores. The grooves 64 are of a second type and their dimensions are adapted with a precise fit to ribs 68 of a plug connector part 70. Thus the grooves 64 form first positioning structures, which interact with the ribs 68 that form second positioning structures.

I claim:

1. A component module, comprising:

a substrate having a top side and having elecrooptical converters with active zones;

a plurality of optical waveguides disposed on said top side of said substrate, said optical waveguides having ends each optically coupled to a respective associated one of said active zones of said elecrooptical converters;

first positioning structures generated by planar structuring and disposed on said top side of said substrate; and a plug connector part connected to said substrate, said plug connector part having at least one mechanical alignment element for mechanical alignment relative to a complementary plug connection partner, and said plug connector part having a joining side facing toward said top side of said substrate, said joining side having second positioning structures cooperating with said first positioning structures.

2. The component module according to claim 1, wherein said first positioning structures are formed from optical waveguide material.

3. The component module according to claim 1, wherein said plug connector part is a plastic copy-molded part, and said substrate is formed of quartz glass.

4. The component module according to claim 1, wherein said top side of said substrate has indentations formed therein for receiving said optical waveguides and indentations formed therein functioning as said first positioning structures.

5. The component module according to claim 2, wherein said first positioning structures are formed simultaneously with said optical waveguides.

6. The component module according to claim 1, wherein said joining side of said plug connectors have longitudinal grooves; and said first positioning structures are longitudinally extending guide bars that correspond to said longitudinal grooves.

* * * * *